(12) United States Patent
Lee et al.

(10) Patent No.: US 8,322,922 B2
(45) Date of Patent: Dec. 4, 2012

(54) METHOD OF OUTPUTTING TEMPERATURE DATA IN SEMICONDUCTOR DEVICE AND TEMPERATURE DATA OUTPUT CIRCUIT THEREFOR

(75) Inventors: Yun-Young Lee, Suwon-si (KR); Kyu-Chan Lee, Seoul (KR); Ho-Cheol Lee, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 595 days.

(21) Appl. No.: 12/605,032

(22) Filed: Oct. 23, 2009

(65) Prior Publication Data

US 2010/0109753 A1 May 6, 2010

(30) Foreign Application Priority Data

Nov. 5, 2008 (KR) .................. 10-2008-0109335

(51) Int. Cl.
*G01K 7/01* (2006.01)
*G01K 7/14* (2006.01)
(52) U.S. Cl. .................. 374/170; 374/100
(58) Field of Classification Search ............ 374/1, 16, 374/163, 161, 101
See application file for complete search history.

(56) References Cited

U.S. PATENT DOCUMENTS

| | | | | |
|---|---|---|---|---|
| 3,859,644 A * | 1/1975 | Main | | 374/102 |
| 3,882,384 A * | 5/1975 | List | | 374/178 |
| 3,913,833 A * | 10/1975 | Minett et al. | | 374/118 |
| 4,061,033 A * | 12/1977 | Nixon | | 374/103 |
| 4,419,021 A * | 12/1983 | Terada et al. | | 374/101 |
| 4,437,771 A * | 3/1984 | Cazzaniga | | 374/39 |
| 4,450,713 A * | 5/1984 | Arimatsu | | 374/142 |
| 4,652,143 A * | 3/1987 | Wickersheim et al. | | 374/161 |
| 5,070,737 A * | 12/1991 | Reilly | | 374/163 |
| 5,626,425 A * | 5/1997 | Fujikawa et al. | | 374/163 |
| 5,709,470 A * | 1/1998 | Finley | | 374/16 |
| 7,248,527 B2 | 7/2007 | Park | | |
| 7,581,881 B2 * | 9/2009 | Kim et al. | | 374/170 |
| 7,988,354 B2 * | 8/2011 | Jansen | | 374/170 |
| 2010/0061160 A1 * | 3/2010 | Jeong | | 374/163 |
| 2010/0085387 A1 * | 4/2010 | Kim et al. | | 345/690 |
| 2010/0109753 A1 * | 5/2010 | Lee et al. | | 327/513 |
| 2012/0002697 A1 * | 1/2012 | Cho | | 374/45 |

FOREIGN PATENT DOCUMENTS

| | | |
|---|---|---|
| JP | 2006-040527 | 2/2006 |
| KR | 1020010004581 A | 1/2001 |
| KR | 1020060010952 | 2/2006 |
| KR | 100701706 B1 | 3/2007 |

* cited by examiner

*Primary Examiner* — Yaritza Guadalupe-McCall
(74) *Attorney, Agent, or Firm* — F. Chau & Associates, LLC

(57) ABSTRACT

A method of outputting temperature data in a semiconductor device and a temperature data output circuit are provided. A pulse signal is generated in response to a booting enable signal activated in response to a power-up signal and the generation is inactivated in response to a mode setting signal during a power-up operation. A comparison signal is generated in response to the pulse signal by comparing a reference voltage independent of temperature with a sense voltage that varies with temperature change. The temperature data is changed in response to the comparison signal. Thus, the temperature data output circuit can rapidly output the exact temperature of the semiconductor device measured during the power-up operation.

8 Claims, 4 Drawing Sheets

METHOD OF OUTPUTTING TEMPERATURE DATA IN SEMICONDUCTOR DEVICE AND TEMPERATURE DATA OUTPUT CIRCUIT THEREFOR

CROSS-REFERENCE TO RELATED APPLICATION

This application claims under 35 U.S.C. §119 priority to and the benefit of Korean Patent Application No. 10-2008-0109335, filed on Nov. 5, 2008, the entire content of which is incorporated by reference herein.

BACKGROUND

1. Technical Field

The present disclosure relates to a method of outputting temperature data in a semiconductor device and a temperature data output circuit, and more particularly, to a temperature sensing device of a semiconductor device that can rapidly sense and output temperature data at an initial stage of applying power, and a method of outputting temperature data using the same.

2. Discussion of Related Art

Modern semiconductor devices need high speed, a high degree of integration and low power consumption. For a semiconductor device installed in a battery-operated system such as a mobile apparatus, the characteristic of low power consumption becomes particularly significant.

Volatile semiconductor memory devices, such as DRAM in a semiconductor device, typically perform a refresh operation for recharging data at regular intervals to retain stored data, and the refresh operation consumes current. Since the data retention characteristic of the semiconductor memory device varies depending on temperature, when a refresh operation period is properly controlled according to temperature, power consumption due to refresh can be reduced. That is, when the semiconductor memory device is operated at low temperature, the refresh period can be set relatively longer than when it is operated at high temperature, resulting in reduced power consumption. To implement such low power consumption, a temperature sensor is installed in the semiconductor memory device, and a method of controlling the refresh period according to temperature data sensed by the temperature sensor is used.

In particular, attempts are being made to deliver temperature data in the semiconductor memory device to an internal or external controller such as a CPU or memory controller which would then control various operations of the semiconductor memory device according to the temperature data. For example, when the semiconductor memory device reaches over a predetermined temperature (e.g., 80° C.), the CPU makes a clock applied to or produced in the semiconductor memory device slow to prevent damage to the semiconductor memory device, thereby performing a stop function for reducing the temperature of the semiconductor memory device.

SUMMARY

In accordance with an exemplary embodiment of the inventive concept a method of outputting temperature data in a semiconductor device which is capable of rapidly outputting temperature data when power voltage is applied to the semiconductor memory device is provided.

In accordance with an exemplary embodiment of the inventive concept a temperature data output circuit is provided.

In accordance with an exemplary embodiment of the inventive concept, during a power-up operation, a pulse signal is generated in response to a booting enable signal activated in response to a power-up signal, the generating being inactivated in response to a mode setting signal. In response to the pulse signal, a reference voltage independent of temperature is compared with a sense voltage that varies according to a temperature change of the semiconductor device, to provide a comparison signal. In response to the comparison signal, the temperature data of the sensed temperature of the semiconductor device is changed.

The generating of the pulse signal may include generating the pulse signal with a period that becomes longer from a first period to a second period.

Changing the temperature data may further include: generating the reference voltage having a level corresponding to the temperature data; producing the sense voltage that varies according to temperature change; comparing the reference voltage with the sense voltage and generating the comparison signal; and when the booting enable signal is activated, changing the temperature data while sequentially varying a change bit of the temperature data from a predetermined bit to a lower bit in response to the comparison signal.

Generating the pulse signal may include generating the pulse signal with a period that becomes longer from a first period to a second period, and changing of the temperature data may further include: generating the reference voltage having a level corresponding to the temperature data; producing the sense voltage varying according to temperature change;
generating a comparison signal by comparing the reference voltage with the sense voltage; and when the booting enable signal is activated, changing the temperature data while sequentially varying a change bit of the temperature data from a predetermined bit to a lower bit in response to the comparison signal.

Generating the pulse signal may further include generating a pulse signal having a second period in response to a temperature data request signal during a normal to operation of the semiconductor device.

The temperature data may be output to outside the semiconductor device in response to a data output strobe signal.

In accordance with an exemplary embodiment of the inventive concept a temperature data output circuit is provided. A pulse generator is configured to generate a pulse signal in response to a booting enable signal activated in response to a power-up signal and inactivated in response to a mode setting signal during a power-up operation. A temperature sensor is configured to produce a reference voltage corresponding to temperature data and a sense voltage varying according to temperature change by being activated in response to the pulse signal, and to compare the reference voltage with the sense voltage to generate a comparison signal. A code changer is configured to change and output the temperature data in response to the comparison signal.

The code changer may be configured to sequentially vary a change bit of the temperature data from a predetermined bit to a lower bit in response to the comparison signal, when the booting enable signal is additionally applied and activated.

The pulse generator may be configured to generate the pulse signal with a period that becomes longer from a first period to a second period.

In accordance with an exemplary embodiment of the inventive concept, a temperature data output circuit includes a pulse generator configured to generate a pulse signal in response to a booting enable signal activated in response to a power-up signal and in response to a temperature data request signal, and to inactivate generation of the pulse signal in response to a mode setting signal during a power-up operation. A temperature sensor is configured to produce, upon being activated in response to the pulse signal, a reference voltage independent of temperature and a sense voltage that varies with a temperature change of sensed temperature of a semiconductor device and to compare the reference voltage with the sense voltage to generate a comparison signal. A code changer is configured to change and output the temperature data in response to the comparison signal, and to feedback the temperature data to the temperature sensor to vary the reference voltage to correspond to the temperature data. The code changer is configured to sequentially vary a change bit of the temperature data from a predetermined bit to a lower bit in response to the comparison signal, when the booting enable signal is additionally applied and activated. The pulse generator is configured to generate the pulse signal with a period that becomes longer from a first period to a second period. The temperature data is output to outside the temperature data output circuit in response to a data output strobe signal.

BRIEF DESCRIPTION OF THE DRAWINGS

Exemplary embodiments are described in further detail below with reference to the accompanying drawings. It should be understood that various aspects of the drawings may have been exaggerated for clarity.

DETAILED DESCRIPTION OF EXEMPLARY EMBODIMENTS

Figure 1:
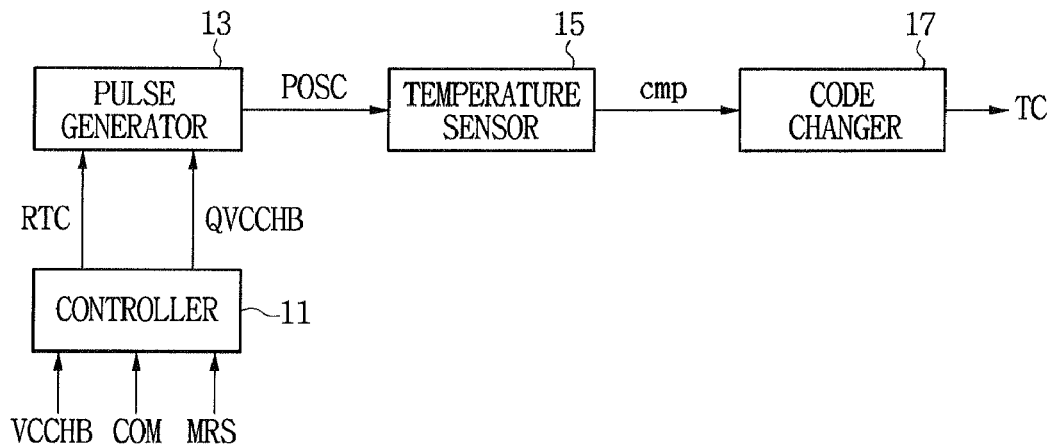
FIG. 1 illustrates a temperature sensing device in a semiconductor device according to an exemplary embodiment of the inventive concept.

Various exemplary embodiments will now be described more fully with reference to the accompanying drawings in which some exemplary embodiments are shown. In the drawings, the thicknesses of layers and regions may be exaggerated for clarity. Like numbers refer to like elements throughout the description of the figures.

Hereinafter, a method of outputting temperature data in a semiconductor device and a temperature data output circuit will be described with reference to the accompanying drawings.

Recently developed semiconductor devices can include a deep power-down mode as well as a sleep mode to reduce power consumption. When the semiconductor device is operated in the deep power-down mode, an internal power voltage applied to the semiconductor device is cut off and external power voltage is applied, thereby preventing unnecessary power consumption. For example, a semiconductor memory device such as DRAM temporarily cuts off an internal power voltage provided to a memory cell when there is no need to retain data in the memory cell.

In the sleep mode widely used in a mobile semiconductor device, an internal voltage is applied to the semiconductor device to retain basic data, but in the deep power-down mode, there is no need for data retention, so that the internal voltage applied to the semiconductor device is completely cut off. Thus, the internal power voltage starts to be applied to the semiconductor memory device at the initial stage of booting and the release of the deep power-down mode of the semiconductor memory device.

Once the power voltage is applied at the initial stage of booting or after the deep power-down mode is released, a conventional semiconductor memory device performs a power-up operation until the power voltage applied thereto is stabilized. When the power-up operation is completed and the power voltage is stabilized, a temperature sensing device is activated by applying a mode setting signal, senses the temperature of the semiconductor memory device, and outputs temperature data to an external CPU or an internal memory controller. However, the temperature sensing device needs a predetermined time to normally sense the temperature of the semiconductor memory device, and during the predetermined time, the temperature sensing device outputs temperature data set higher to prevent a refresh failure. Accordingly, the CPU is changed from a standby mode to an active mode to change a refresh period of the semiconductor memory device in response to the high temperature data output from the semiconductor memory device, or misrecognizes that the semiconductor memory device is operated at high temperature, allowing the semiconductor memory device to perform a stop function.

Figure 2:
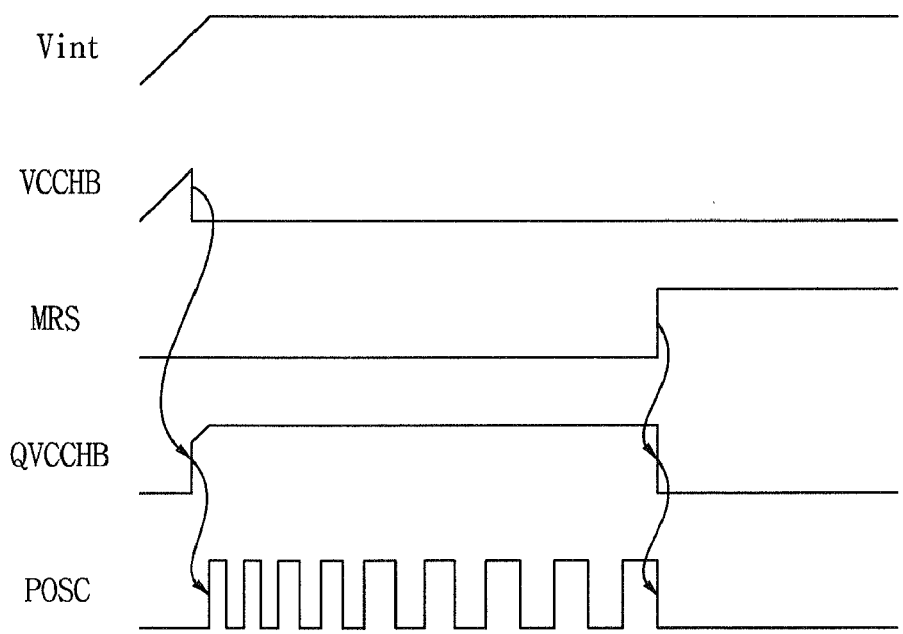
FIG. 2 is a diagram illustrating operations of the temperature sensing device of FIG. 1.

FIG. 1 illustrates a temperature sensing device of a semiconductor device according to an exemplary embodiment of the inventive concept, and FIG. 2 is a diagram illustrating the operation of the temperature sensing device of FIG. 1.

Referring to FIGS. 1 and 2, the temperature sensing device of FIG. 1 includes a pulse generator 13, a temperature sensor 15 and a code changer 17. A controller 11 is a controller of the semiconductor memory device, which receives a power-up signal VCCHB and a mode setting signal MRS and outputs a booting enable signal QVCCHB. As shown in FIG. 2, the power-up signal VCCHB is increased in level as an internal power voltage Vint starts to be applied and increased, and transitions to a low level when the internal power voltage Vint exceeds a predetermined level (e.g., 1.1V). In addition, while FIG. 1 shows that the controller 11 receives the power-up signal VCCHB, the controller 11 may produce the power-up signal VCCHB in response to the internal power voltage Vint. When the power-up signal VCCHB transitions to the low level, the controller 11 activates the booting enable signal QVCCHB to a high level. When the internal power voltage Vint is applied and then the mode setting signal MRS is applied from a mode register (not shown), the controller 11 inactivates the booting enable signal QVCCHB to a low level. That is, the booting enable signal QVCCHB is a signal activated until the mode setting signal MRS is applied after the internal power voltage applied to the semiconductor memory device is stabilized to a predetermined level or higher. The controller 11 applies a temperature data request signal RTC to the pulse generator 13 in response to a command COM applied from a command decoder (not shown). The temperature data request signal RTC is for outputting temperature data TC by sensing the temperature of the semiconductor memory device during a normal operation after the mode setting signal MRS is applied, not at the initial stage of booting or when the deep power-down mode is released.

The pulse generator 13 generates and outputs a pulse signal POSC for driving the temperature sensor 15 in response to the booting enable signal QVCCHB and the temperature data request signal RTC. Here, the pulse generator 13 generates the pulse signal POSC having a regular period when the pulse generator 13 generates the pulse signal POSC in response to the temperature data request signal RTC. However, when the pulse generator 13 generates and outputs the pulse signal POSC in response to the booting enable signal QVCCHB, as shown in FIG. 2, the pulse generator 13 generates and outputs the pulse signal POSC with a period that is shorter than the period of the pulse signal POSC generated in response to the temperature data request signal RTC in the beginning, and then gradually gets longer.

The temperature sensor 15 is activated in response to a first level of the pulse signal POSC, thereby sensing the temperature. The temperature sensor 15 generally includes a bandgap reference and a comparator, and the bandgap reference generates a reference voltage that is independent of temperature and a sense voltage that is dependant on temperature, and outputs a comparison signal cmp by comparing the reference voltage with the sense voltage. In addition, the temperature sensor 15 increases or decreases the reference voltage by a predetermined level unit in response to the comparison signal cmp, after outputting the comparison signal cmp. After that, the temperature sensor 15 compares the sense voltage with the reference voltage whose level is raised or lowered in response to the first level of the pulse signal POSC applied.

The code changer 17 outputs the temperature data TC whose level is raised or lowered by a predetermined unit (e.g. 1 bit) in response to the comparison signal cmp.

The temperature sensing device described with reference to FIG. 1 generates the pulse signal POSC having a period which is short at the beginning and gradually gets longer in response to the booting enable signal QVCCHB applied from the controller 11 during booting or when the deep power-down mode is released, and the temperature sensor 15 senses the internal temperature of the semiconductor memory device in response to the pulse signal POSC. Thus, during the short period of the pulse signal POSC, a temperature code approximating the temperature of the semiconductor memory device can be very rapidly obtained. As the period of the pulse signal POSC becomes longer, a sufficient timing margin for the temperature sensor to compare the reference voltage with the sense voltage can be obtained, resulting in sensing the exact temperature of the semiconductor memory device. As a result, the temperature sensing device of FIG. 1 starts a temperature sensing operation as soon as the internal power voltage Vint is applied to the semiconductor memory device, and finishes the temperature sensing operation before the mode setting signal MRS is applied thereto. Thus, the temperature sensing device can sense the exact temperature of the semiconductor memory device, even upon release of the deep power-down mode which has a relatively shorter power-up operation than booting.

Figure 3:
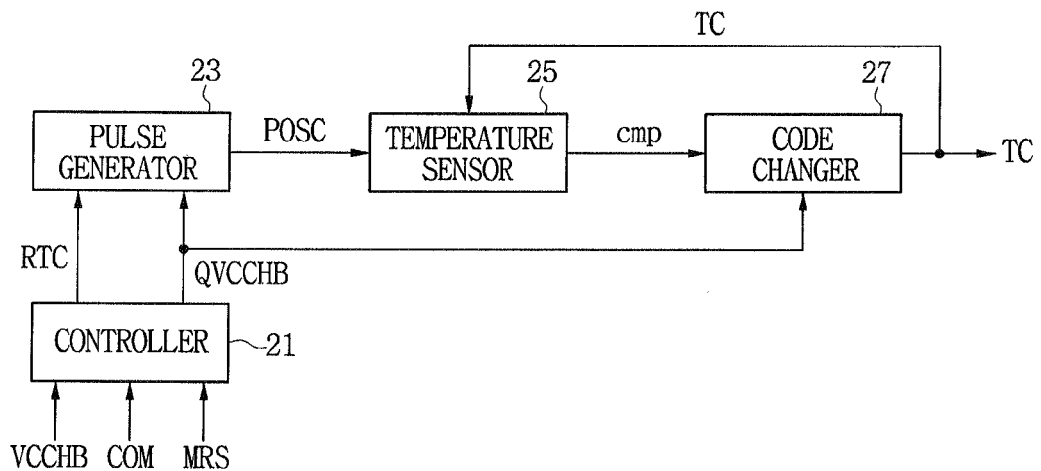
FIG. 3 illustrates a temperature sensing device of a semiconductor device according to an exemplary embodiment of the inventive concept.
Figure 4:
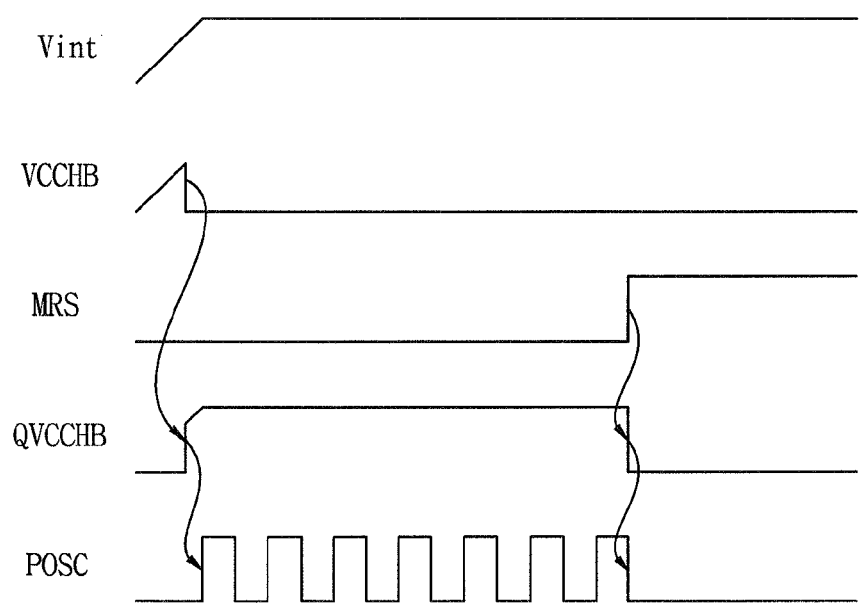
FIG. 4 is a diagram illustrating operations of the temperature sensing device of FIG. 3.

As described above, while the temperature sensor 15 increases or decreases the level of the reference voltage by a predetermined level unit in response to the comparison signal cmp, the temperature sensor 15 can also receive temperature data TC from the code changer 17 and produce a reference voltage corresponding to the temperature data TC. This is shown in FIG. 3 which illustrates a temperature sensing device of a semiconductor device according to another exemplary embodiment. FIG. 4 is a diagram illustrating the operation of the temperature sensing device of FIG. 3.

The temperature sensing device of FIG. 3, like that of FIG. 1, also includes a pulse generator 23, a temperature sensor 25 and a code changer 27. A controller 21 serves as a controller of a semiconductor memory device, as in FIG. 1, outputs a booting enable signal QVCCHB in response to a power-up signal VCCHB and a mode setting signal MRS, and applies a temperature data request signal RTC to the pulse generator 23 in response to a command COM applied from a command decoder (not shown).

The pulse generator 23 generates and outputs a pulse signal POSC for driving the temperature sensor 25 in response to the booting enable signal QVCCHB and the temperature data request signal RTC. However, unlike the pulse generator 13 of FIG. 1, even when the booting enable signal QVCCHB is applied, the period of the pulse signal POSC is not varied. That is, the pulse generator 23 generates the pulse signal POSC having a predetermined period and outputs the pulse signal POSC to the temperature sensor 25 even when the booting enable signal QVCCHB is applied.

The temperature sensor 25 is activated in response to a first level of the pulse signal POSC and senses the temperature of the semiconductor memory device. However, the temperature sensor 25 of FIG. 3 generates a reference voltage varied according to the temperature data TC applied from the code changer 27, and generates a sense voltage altered according to a temperature of the semiconductor memory device. A comparison signal cmp is output by comparing the reference voltage with the sense voltage.

The code changer 27 outputs the temperature data TC whose level is raised or lowered in response to the comparison signal cmp. Here, the code changer 27 of FIG. 3 changes an up or down unit of the temperature data TC in response to the booting enable signal QVCCHB. For example, when the booting enable signal QVCCHB is applied, the code changer 27 changes the temperature data (TC) at a third bit from the least significant bit (LSB) an initial predetermined number of times (e.g., 3 times), at a second bit from the least significant bit (LSB) the next predetermined number of times, and then at the least significant bit (LSB) the last predetermined number of times.

The temperature sensor 25 of FIG. 3 varies the reference voltage in response to temperature data TC, so that the reference voltage is changed in a wide range at the initial stage of sensing a temperature at which a high bit unit is changed. As the temperature data TC is sequentially changed at a low bit unit, the reference voltage of the temperature sensor 25 is also changed in a narrow range.

By controlling a change bit of the temperature data TC as described above, an approximate temperature code of the temperature of the semiconductor memory device can be obtained very rapidly at the initial stage of sensing temperature, and the temperature data TC gradually corresponding to the exact temperature of the semiconductor memory device can be obtained, much like the temperature sensing device of FIG. 1. As a result, the exact temperature of the semiconductor memory device can be rapidly sensed.

Figure 5A:
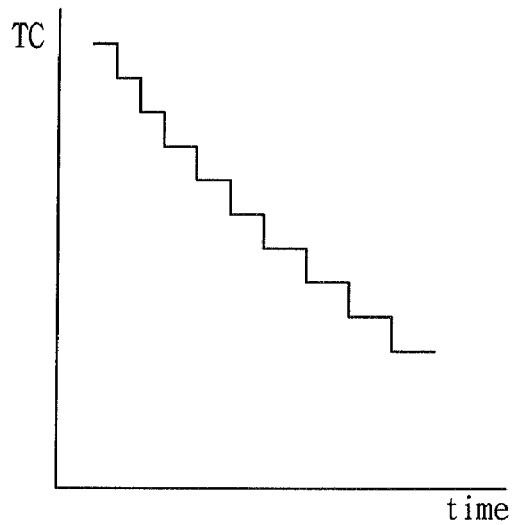
FIGS. 5A, 5B and 5C are graphs of temperature sensed by the temperature sensing device according to an exemplary embodiment of the inventive concept.
Figure 5B:
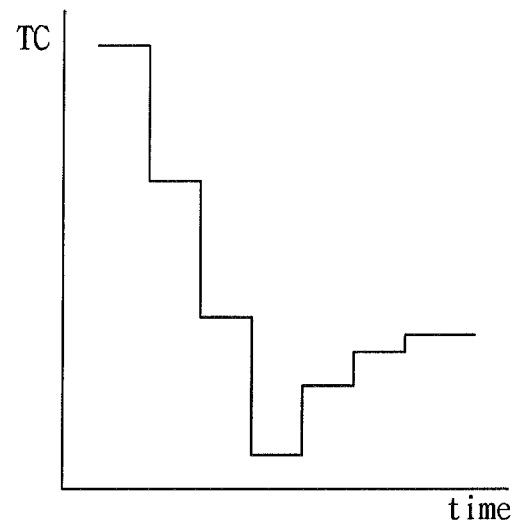
Figure 5C:
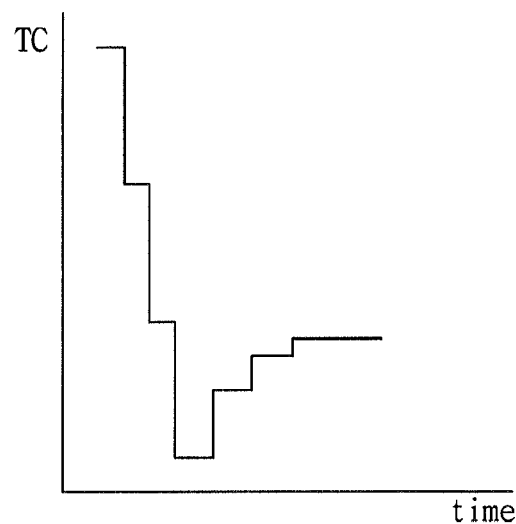

FIGS. 5A to 5C are graphs of temperature data output by a temperature sensing device according to the exemplary embodiments of the inventive concept.

FIG. 5A is a graph of temperature data output by the temperature sensing device of FIG. 1, in which a period of a pulse signal POSC gradually becomes longer, and the temperature sensor 15 varies the reference voltage by a predetermined unit. Thus, the temperature data TC of FIG. 5A is changed at intervals which are short at the beginning and gradually get longer. However, the changing units for the temperature data TC are identical.

FIG. 5B is a graph of temperature data output by the temperature sensing device of FIG. 3, in which the period of a pulse signal POSC is uniform, but the temperature sensor 25 varies the reference voltage in response to the temperature data TC having a varying change bit unit. Thus, although the temperature data TC of FIG. 5B is changed in the same time unit, the change in temperature data TC starts out large and gradually gets smaller.

FIG. 5C is a graph of temperature data output by a temperature sensing device having a combined function of the temperature sensing devices of FIGS. 1 and 3. That is, in this temperature sensing device, a pulse signal POSC with a period that becomes longer is generated using the pulse generator 13 of FIG. 1, and a change unit of temperature data varies over time using the temperature sensor 25 and the code changer 27 of FIG. 3. Thus, the temperature data TC is changed more at short intervals in the beginning, and then gradually less at longer intervals. As a result, as shown in FIG. 5C, the temperature data TC can very rapidly exhibit the exact temperature of a semiconductor memory device, as compared to those of FIGS. 5A and 5B.

Figure 6:
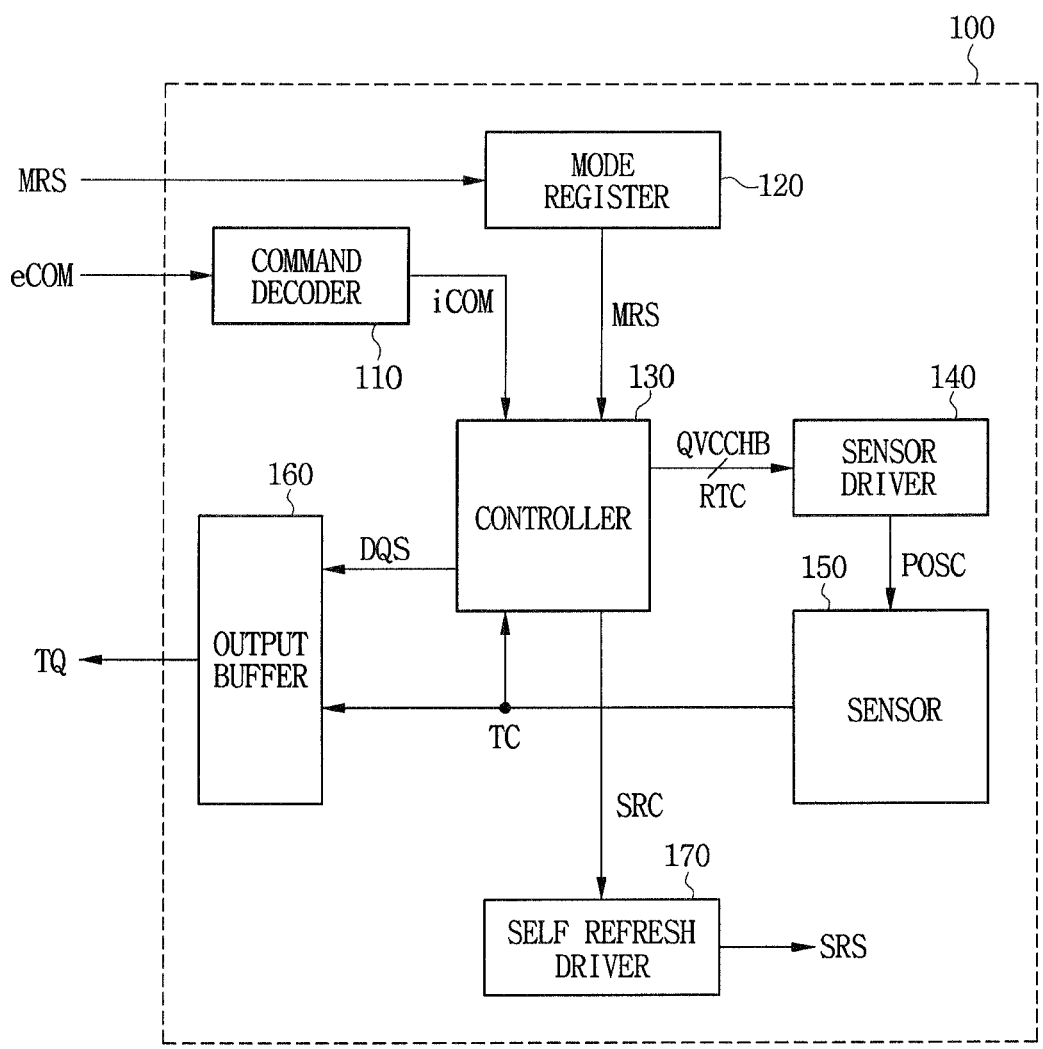
FIG. 6 illustrates a part of a semiconductor device having a temperature sensing device according to an exemplary embodiment of the inventive concept.

FIG. 6 is a schematic diagram of a semiconductor device having a temperature sensing device according to an exemplary embodiment of the inventive concept.

FIG. 6 shows a part of the semiconductor memory device which is associated with the temperature sensing device. First, a command decoder 110 decodes an external command eCOM applied from the outside and outputs an internal command iCOM to a controller 130. A mode register 120 then receives and stores a mode setting signal MRS applied from outside, and outputs the stored mode setting signal MRS to the controller 130.

When an internal power voltage Vint is applied to the semiconductor memory device, the controller 130 activates a booting enable signal QVCCHB as described above and outputs the signal to a sensor driver 140. In addition, when the mode setting signal MRS is applied, the booting enable signal QVCCHB is inactivated. If the internal command iCOM applied from the command decoder 110 is a temperature sensing command, a temperature data request signal RTC is output to the sensor driver 140. The controller 130 outputs a data output strobe signal DQS to an output buffer 160 to control data output timing of the output buffer 160. When the temperature data TC is applied, a self refresh control signal SRC is output to control a self refresh period in response to the temperature data TC. However, the controller 130 may output the self refresh control signal SRC in response to the internal command iCOM applied from the command decoder 110.

The sensor driver 140 corresponds to the pulse generators 13, 23 of FIGS. 1 and 3, and generates and outputs a pulse signal POSC in response to the booting enable signal QVCCHB or the temperature data request signal RTC applied from the controller 130.

A sensor 150 corresponds to the temperature sensors 15, 25, and the code changers 17, 27 of FIGS. 1 and 3, and outputs the temperature data TC by sensing the temperature of the semiconductor device in response to the pulse signal POSC.

The output buffer 160 receives the temperature data TC and outputs temperature data TQ to the outside in response to the data output strobe signal DQS applied from the controller 130, and if the data output strobe signal DQS is inactivated, the output buffer 160 maintains a high-impedance (Hi-Z) state.

A self refresh driver 170 changes a self refresh period in response to the self refresh control signal SRC, and outputs a self refresh start signal SRS for a self-refresh operation during a self refresh mode.

As shown in FIGS. 5A to 5C, the temperature sensing device is not capable of promptly producing exact temperature data during booting or when a deep power-down mode is released. However, the output buffer 160 outputs the temperature data TQ only when the data output strobe signal DQS is activated, after the mode setting signal MRS is applied. Thus, when the temperature sensing device obtains the temperature data corresponding to temperature of the semiconductor memory device before the mode setting signal MRS is applied, the temperature data TQ output to the outside can exhibit the exact temperature of the semiconductor memory device.

Consequently, according to a method of outputting temperature data in a semiconductor memory device and a temperature data output circuit of the inventive concept, temperature data may be output by rapidly and exactly sensing temperature when a power voltage is applied during booting or when a deep power-down mode is released. Therefore, a system having a semiconductor memory device may reduce power consumption and prevent malfunction.

The foregoing is illustrative of exemplary embodiments and is not to be construed as limiting thereof. Although exemplary embodiments have been described, those skilled in the art will readily appreciate that many modifications are possible to exemplary embodiments without materially departing from the novel teachings and advantages. Accordingly, all such modifications are intended to be included within the scope of this invention as defined in the claims.

What is claimed is:

1. A method of outputting temperature data of sensed temperature of a semiconductor device, comprising:
   during a power-up operation, generating a pulse signal, in response to a booting enable signal activated in response to a power-up signal, the generating being inactivated in response to a mode setting signal;
   comparing, in response to the pulse signal, a reference voltage independent of temperature with a sense voltage that varies according to a temperature change of the semiconductor device, to provide a comparison signal; and
   changing, in response to the comparison signal, the temperature data of the sensed temperature of the semiconductor device,
   wherein changing the temperature data further comprises:
   generating the reference voltage having a level corresponding to the temperature data;
   producing the sense voltage that varies according to temperature change;
   comparing the reference voltage with the sense voltage and generating the comparison signal; and
   when the booting enable signal is activated, changing the temperature data while sequentially varying a change bit of the temperature data from a predetermined bit to a lower bit in response to the comparison signal.

2. The method according to claim 1, wherein the generating of the pulse signal further comprises generating the pulse signal with a period that becomes longer from a first period to a second period.

3. The method according to claim 1, wherein generating the pulse signal further comprises generating a pulse signal having a second period in response to a temperature data request signal during a normal operation of the semiconductor device.

4. The method according to claim 1, further comprising outputting the temperature data to outside the semiconductor device in response to a data output strobe signal.

5. A method of outputting temperature data of sensed temperature of a semiconductor device, comprising:
during a power-up operation, generating a pulse signal, in response to a booting enable signal activated in response to a power-up signal, the generating being inactivated in response to a mode setting signal;
comparing, in response to the pulse signal, a reference voltage independent of temperature with a sense voltage that varies according to a temperature change of the semiconductor device, to provide a comparison signal; and
changing, in response to the comparison signal, the temperature data of the sensed temperature of the semiconductor device,
wherein:
generating the pulse signal further comprises generating the pulse signal with a period that becomes longer from a first period to a second period, and
changing of the temperature data includes:
generating the reference voltage having a level corresponding to the temperature data;
producing the sense voltage varying according to temperature change;
generating a comparison signal by comparing the reference voltage with the sense voltage; and
when the booting enable signal is activated, changing the temperature data while sequentially varying a change bit of the temperature data from a predetermined bit to a lower bit in response to the comparison signal.

6. The method according to claim 5, wherein generating the pulse signal further comprises generating a pulse signal having a second period in response to a temperature data request signal during a normal operation of the semiconductor device.

7. The method according to claim 5, further comprising outputting the temperature data to outside the semiconductor device in response to a data output strobe signal.

8. A temperature data output circuit, comprising:
a pulse generator configured to generate a pulse signal in response to a booting enable signal activated in response to a power-up signal and in response to a temperature data request signal, and to inactivate generation of the pulse signal in response to a mode setting signal during a power-up operation;
a temperature sensor configured to produce, upon being activated in response to the pulse signal, a reference voltage independent of temperature and a sense voltage that varies with a temperature change of sensed temperature of a semiconductor device and to compare the reference voltage with the sense voltage to generate a comparison signal; and
a code changer configured to change and output the temperature data in response to the comparison signal, and to feedback the temperature data to the temperature sensor to vary the reference voltage to correspond to the temperature data,
wherein the code changer is configured to sequentially vary a change bit of the temperature data from a predetermined bit to a lower bit in response to the comparison signal, when the booting enable signal is additionally applied and activated,
wherein the pulse generator is configured to generate the pulse signal with a period that becomes longer from a first period to a second period, and
wherein the temperature data is output to outside the temperature data output circuit in response to a data output strobe signal.

* * * * *